(12) United States Patent
Bolz et al.

(10) Patent No.: US 9,978,171 B2
(45) Date of Patent: May 22, 2018

(54) CONTROL OF A SAMPLE MASK FROM A FRAGMENT SHADER PROGRAM

(71) Applicant: NVIDIA Corporation, Santa Clara, CA (US)

(72) Inventors: Jeffrey Alan Bolz, Austin, TX (US); Eric B. Lum, San Jose, CA (US); Rui Manuel Bastos, Porto Alegre (BR)

(73) Assignee: NVIDIA Corporation, Santa Clara, CA (US)

( * ) Notice: Subject to any disclaimer, the term of this patent is extended or adjusted under 35 U.S.C. 154(b) by 155 days.

(21) Appl. No.: 14/810,178

(22) Filed: Jul. 27, 2015

(65) Prior Publication Data

US 2016/0035129 A1    Feb. 4, 2016

Related U.S. Application Data

(60) Provisional application No. 62/030,497, filed on Jul. 29, 2014.

(51) Int. Cl.
| | | |
|---|---|---|
| *G06T 15/80* | (2011.01) | |
| *G06T 1/20* | (2006.01) | |
| *G06T 1/60* | (2006.01) | |
| *G06T 15/00* | (2011.01) | |

(52) U.S. Cl.
CPC ............. *G06T 15/80* (2013.01); *G06T 1/20* (2013.01); *G06T 1/60* (2013.01); *G06T 15/005* (2013.01)

(58) Field of Classification Search
None
See application file for complete search history.

(56) References Cited

U.S. PATENT DOCUMENTS

| 7,876,332 B1 | 1/2011 | Donham et al. |
|---|---|---|
| 2009/0213128 A1 | 8/2009 | Chen |

(Continued)

FOREIGN PATENT DOCUMENTS

| CN | 101620725 A | 1/2010 |
|---|---|---|
| CN | 101689306 A | 3/2010 |
| CN | 101916453 A | 12/2010 |

(Continued)

OTHER PUBLICATIONS

Office Action from Taiwanese Application No. 104124570, dated Aug. 9, 2016.

(Continued)

*Primary Examiner* — Ke Xiao
*Assistant Examiner* — Jed-Justin Imperial
(74) *Attorney, Agent, or Firm* — Zilka-Kotab, PC

(57) ABSTRACT

A method, system, and computer program product for controlling a sample mask from a fragment shader are disclosed. The method includes the steps of generating a fragment for each pixel that is covered, at least in part, by a primitive and determining coverage information for each fragment corresponding to the primitive. Then, for each fragment, the method includes the steps of generating a sample mask by a fragment shader, replacing the coverage information for the fragment with the sample mask, and writing, based on the sample mask, a result generated by the fragment shader to a memory. The method may be implemented on a parallel processing unit configured to implement, at least in part, a graphics processing pipeline.

20 Claims, 10 Drawing Sheets

(56) References Cited

U.S. PATENT DOCUMENTS

2012/0320069 A1* 12/2012 Lee .................... G06F 9/505
                                                                              345/505
2013/0141445 A1    6/2013 Engh-halstvedt et al.

FOREIGN PATENT DOCUMENTS

| TW | 201426301 A | 7/2014 |
| TW | 201426633 A | 7/2014 |
| TW | 201428676 A | 7/2014 |
| TW | 201428678 A | 7/2014 |

OTHER PUBLICATIONS

Office Action from Chinese Application No. 201510455557.9, dated Jan. 10, 2018.

* cited by examiner

CONTROL OF A SAMPLE MASK FROM A FRAGMENT SHADER PROGRAM

CLAIM OF PRIORITY

This application claims the benefit of U.S. Provisional Application No. 62/030,497 titled "Control of a Sample Mask from a Fragment Shader Program," filed Jul. 29, 2014, the entire contents of which is incorporated herein by reference.

FIELD OF THE INVENTION

The present invention relates to graphics processing, and more partial any to control of a sample mask generated during rasterization of primitives.

BACKGROUND

Many applications, such as games and office productivity software, are configured to generate graphics for display on computer systems. The graphics may include two-dimensional graphics or three-dimensional graphics. The graphics may be generated by software executing on a conventional central processing unit (CPU). Alternatively, the graphics may be generated by hardware implemented in a specialized co-processing unit such as a graphics processing unit (GPU), or by some combination of hardware and software executed by either the CPU and/or the GPU. In order to make the programming of such applications easier, special graphics application programming interfaces (APIs) such as DirectX and OpenGL, among others, were created to create an abstraction between the functionality of generating graphics and the hardware used to implement such functionality.

An API may specify an abstract graphics rendering pipeline that defines different steps in the rendering of graphics. For example, a graphics rendering pipeline specified by the OpenGL API may include a vertex shading stage, a geometry shading stage, a rasterization stage, and a fragment shading stage. The graphics rendering pipeline receives graphics primitives specified by the application and processes those primitives through each of the stages of the graphics processing pipeline to produce pixel data for display on a display device. The rasterization stage describes the operation of transforming a primitive such as a triangle into a number of fragments for processing by a fragment shading stage. In other words, the primitive, which is specified by a plurality of vertices, is intersected with the pixels (or sub-samples of the pixels) specified for a particular screen space and attribute values associated with the primitive are interpolated across the primitive tier each of the pixels (or sub-samples of the pixels).

When anti-aliasing techniques are implemented, coverage information that indicates which sub-samples of a pixel are covered by a primitive may also be generated during rasterization. Typically, this coverage information is specified as a mask. The mask may correspond to a particular fragment of the primitive and each element in the mask may correspond to a particular sub-sample of the pixel. For example, if a particular pixel includes 16 sub-samples, then the mask may include 16 bits that indicate whether each of the sub-samples in that pixel is covered by the primitive. Certain algorithms may wish to change the coverage information associated with a given fragment. However, conventional hardware may not be configured to update the coverage information generated during the rasterization stage arbitrarily. Thus, there is a need for addressing these issues and/or other issues associated with the prior art.

SUMMARY

A method, system, and computer program product for controlling a sample mask from a fragment shader are disclosed. The method includes the steps of generating a fragment for each pixel that is covered, at least in part, by a primitive and determining coverage information for each fragment corresponding to the primitive. Then, for each fragment, the method includes the steps of generating a sample mask by a fragment shader, replacing the coverage information for the fragment with the sample mask, and writing, based on the sample mask, a result generated by the fragment shader to a memory. The method may be implemented on a parallel processing unit configured to implement, at least in part, a graphics processing pipeline.

BRIEF DESCRIPTION OF THE DRAWINGS

FIG. 7A illustrates a primitive, in accordance with one embodiment;

FIG. 7B illustrates the coverage information for a fragment, in accordance with one embodiment;

DETAILED DESCRIPTION

Figure 1:
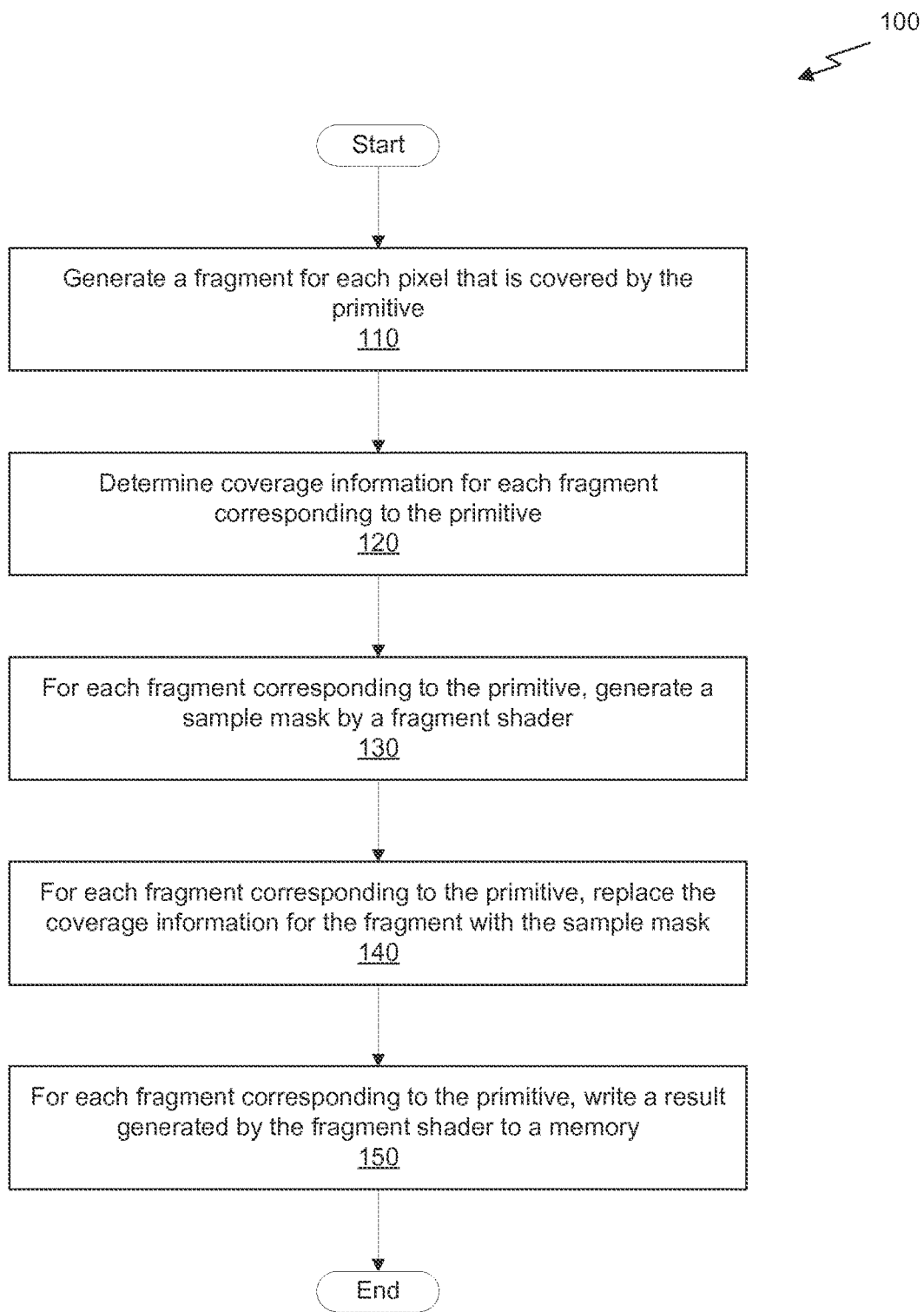
FIG. 1 illustrates a flowchart of a method for controlling a sample mask from a fragment shader program, in accordance with one embodiment.

One commonly utilized graphics API is Microsoft® DirectX, which includes the Direct3D API for rendering three-dimensional graphics and the Direct2D API for rendering two-dimensional graphics. In Direct3D, a render target may be created for storing color data for display of computer-generated graphics. A "render target" in D3D refers to a buffer (i.e., an allocated portion of memory) where image data for a scene is stored. Multi-sample antialiasing (MSAA) may be implemented using a render target that stores multiple color samples per pixel. The multiple color samples for a pixel are then blended together to produce the final pixel color for a pixel. However, the resolution of a MSAA (i.e., the number of samples per pixel) may be limited based on the size of the memory available to the graphics hardware.

Microsoft® Direct3D version 11.1 (hereinafter referred to as D3D11) includes a new functionality referred to as Target-Independent Rasterization (TIR). D3D11 TIR enables multiple raster samples to be utilized during rendering while only a single color sample is stored in the render target. A pixel shader may be configured to process the coverage information associated with the multiple raster samples to generate the single color sample value stored in the render target. D3D11 TIR enables vector graphics drawn using Direct2D to be processed with GPU acceleration rather than being rendered entirely on a CPU. However, one drawback to D3D11 TIR is that depth and stencil testing must be disabled when MSAA is utilized with a non-multisample color buffer.

While the pixel shader receives coverage information for a primitive generated during rasterization, the pixel shader is only configured to process the coverage information to generate a single color value for output to the render target. The single color value may be based, at least in part, on a number of set bits in the coverage information. While the pixel shader receives the coverage information as input, the coverage information generated during rasterization is not modified. Instead, the coverage information is merely used to adjust the color value of the single sample output by the pixel shader and stored in the render target.

Another commonly utilized graphics API is OpenGL®, which also includes functions for rendering three-dimensional and two-dimensional graphics. OpenGL® also implements MSAA by generating coverage information during rasterization of a primitive. The coverage information is provided to a fragment shader. In OpenGL® the fragment shader may write a value to an output array, gl_SampleMask, which enables the fragment shader to modify the coverage information generated during rasterization. As described in the OpenGL® specification, coverage for the fragment will become the logical AND of the coverage information and the value written to gl_SampleMask. Setting a bit in gl_SampleMask to zero (0) will cause the corresponding sample to be considered uncovered for the purposes of MSAA. However, setting a bit in gl_SampleMask to one (1) will never cause a sample not covered by the original primitive to be considered covered for the purposes of MSAA. Thus, while the value written to the gl_SampleMask output array specified by OpenGL® may be used to modify a coverage mask, the value written to the gl_SampleMask output array cannot be used to overwrite the coverage information generated during rasterization.

Neither D3D11 TIR nor the functionality enabled by the OpenGL® gl_SampleMask output array enables a fragment shader complete control to overwrite coverage information for multiple samples of a pixel generated during rasterization. At the very least, the fragment shader cannot change a particular sample to be indicated as covered instead of uncovered. Certain algorithms that require this functionality can, therefore, not be implemented using conventional graphics acceleration hardware.

FIG. 1 illustrates a flowchart of a method 100 for controlling a sample mask from a fragment shader program, in accordance with one embodiment. At step 110, a fragment is generated for each pixel that is covered, at least in part, by a primitive during a rasterization stage of a graphics processing pipeline. The rasterization stage refers to an operation fir converting a graphics primitive specified in a vector format (i.e., via a plurality of vertices) into a raster format (i.e., a plurality of pixels or fragments). The rasterization stage generates one fragment for each pixel covered by the primitive.

A processor, such as a GPU, may implement at least a portion of the graphics processing pipeline. In one embodiment, the rasterization stage of the graphics processing pipeline is implemented by a fixed function hardware unit configured to receive a primitive and output one or more fragments for processing by one or more additional stages of the graphics processing pipeline. In another embodiment, the rasterization stage of the graphics processing pipeline is implemented by a programmable, streaming multiprocessor included in a GPU.

A primitive may be defined as a collection of vertices, where each vertex includes a coordinate in three-dimensional space as well as one or more vertex attributes such as a color, one or more texture coordinates, a normal vector, and the like. The rasterization stage of the graphics processing pipeline may receive data that defines a primitive from a preceding stage of the graphics processing pipeline, implemented on the GPU or by software executed by a CPU. A fragment may include one or more interpolated attributes as well as coverage information related to a plurality of samples associated with a particular pixel. The data defining the primitives and fragments may be stored in data structures.

At step 120, coverage information for each fragment corresponding to the primitive is determined during the rasterization stage of the graphics processing pipeline. The coverage information may be a mask that indicates whether each sample location associated with the pixel is covered by the primitive. A sample location is determined to be covered when a ray from a camera position that passes through the sample location passes through a closed surface defined by the edges of the primitive. In other words, a sample location is determined to be covered when the sample location, which lies on a viewing plane, lies inside a projected version of the primitive on the viewing plane.

In one embodiment, a fixed function hardware unit may include a number of logic units, each logic unit configured to compute a sample location in two-dimensional coordinates relative to a location for a pixel. Each logic unit may then compare the coordinate for the sample location with the projected vertices of the primitive in order to determine whether that sample location is covered or uncovered. The coverage information for each of the samples may be collected into a mask.

At step 130, for each fragment corresponding to the primitive, a sample mask is generated by a fragment shader during a fragment shading stage of the graphics processing pipeline. The sample mask may correspond to the number of sample locations associated with a pixel. For example, if the coverage information comprises a 16-bit mask corresponding to 16 sample locations, then the sample mask may also comprise a 16-bit mask, each bit in the sample mask corresponding to a different sample location for the pixel.

In one embodiment, the fragment shading stage is implemented by a programmable, streaming multiprocessor included in a GPU. The streaming multiprocessor may be configured to execute a fragment shader (i.e., a program configured to process fragments). A different instance of the fragment shader (i.e., a fragment shader thread) may be executed for each fragment generated during the rasterization stage of the graphics processing pipeline.

The fragment shader may include instructions, executed by the GPU, which cause the sample mask to be generated and stored in a memory of the GPU (e.g., a register, DRAM, etc.). Different algorithms will dictate how the sample mask is generated. For example, if an algorithm calls for the use of conservative rasterization, all bits of the sample mask may be set if any sample location associated with the fragment is covered as determined during the rasterization stage of the graphics processing pipeline. In another example, in an algorithm associated with path rendering, coverage information associated with a particular sample location may be copied to additional sample locations of the sample mask. In one embodiment, the value of the sample mask is determined, at least in part, by the coverage information generated during the rasterization stage of the graphics processing pipeline. In another embodiment, the value of the sample mask may be determined completely independent of the coverage information. For example, the sample mask may represent an arbitrary location in a multi-sample color buffer where the output of the fragment shader should be written.

At step 140, for each fragment corresponding to the primitive, the coverage information for the fragment, generated during a rasterization stage of the graphics processing pipeline, is replaced with the sample mask. In one embodiment, the coverage information may be overwritten by the sample mask. In another embodiment, the coverage information may be modified to indicate the fragment is fully covered (i.e., all bits of the coverage information are set to 1), and a bitwise AND operation is used to blend the modified coverage information with the sample mask.

At step 150, for each fragment corresponding to the primitive, a result, generated during the fragment shading stage of the graphics processing pipeline, is written to a memory based on the sample mask. In one embodiment, the memory comprises a frame buffer that includes a color buffer. The color buffer may refer to memory allocated to store one or more color values per pixel. The frame buffer may also include a depth buffer and/or stencil buffer for storing depth values and/or stencil values, respectively, associated with each sample location for each pixel of a surface being rendered. A resolution of the color buffer may be the same as or different from a resolution of the depth buffer and stencil buffer.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
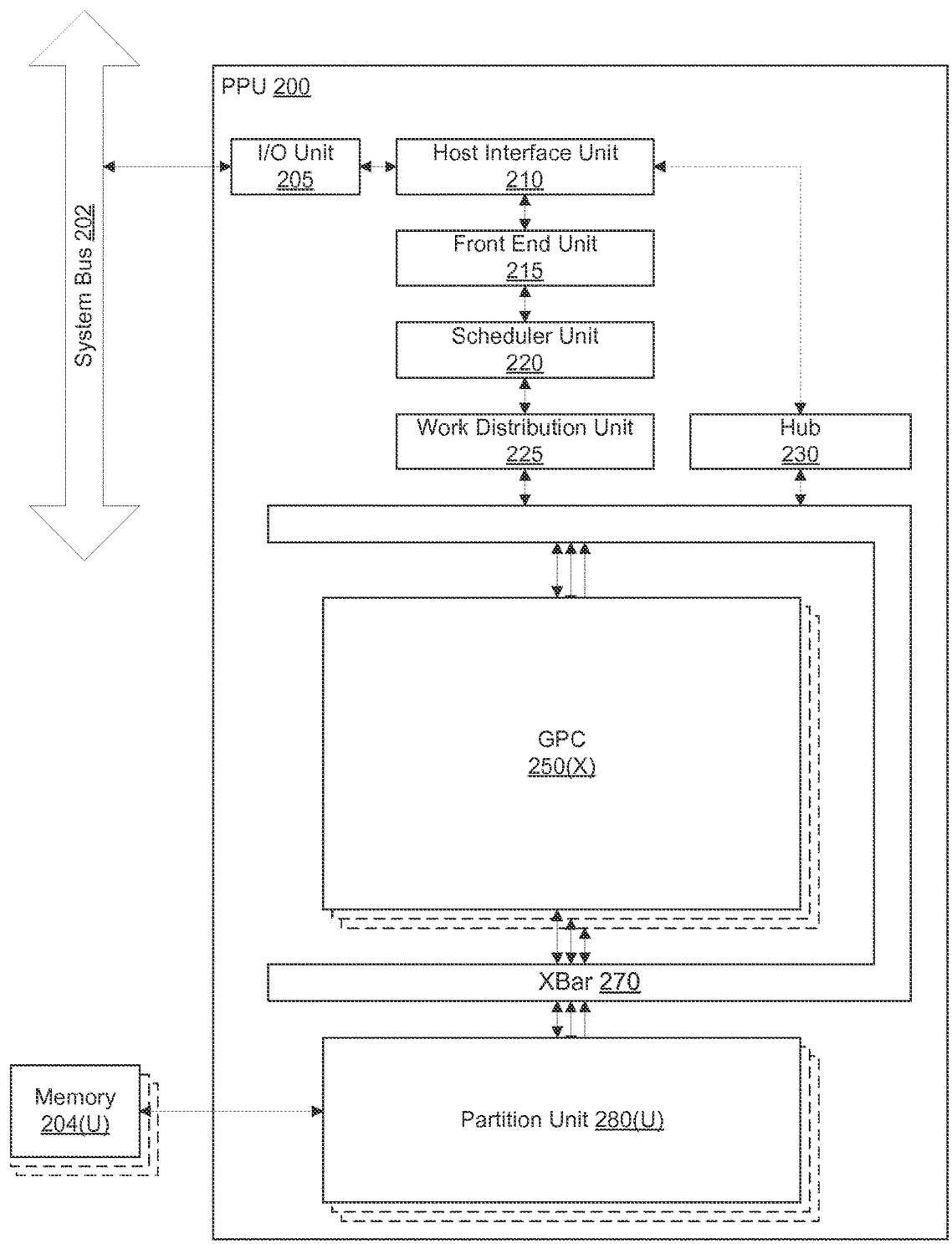
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data tier display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via a XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
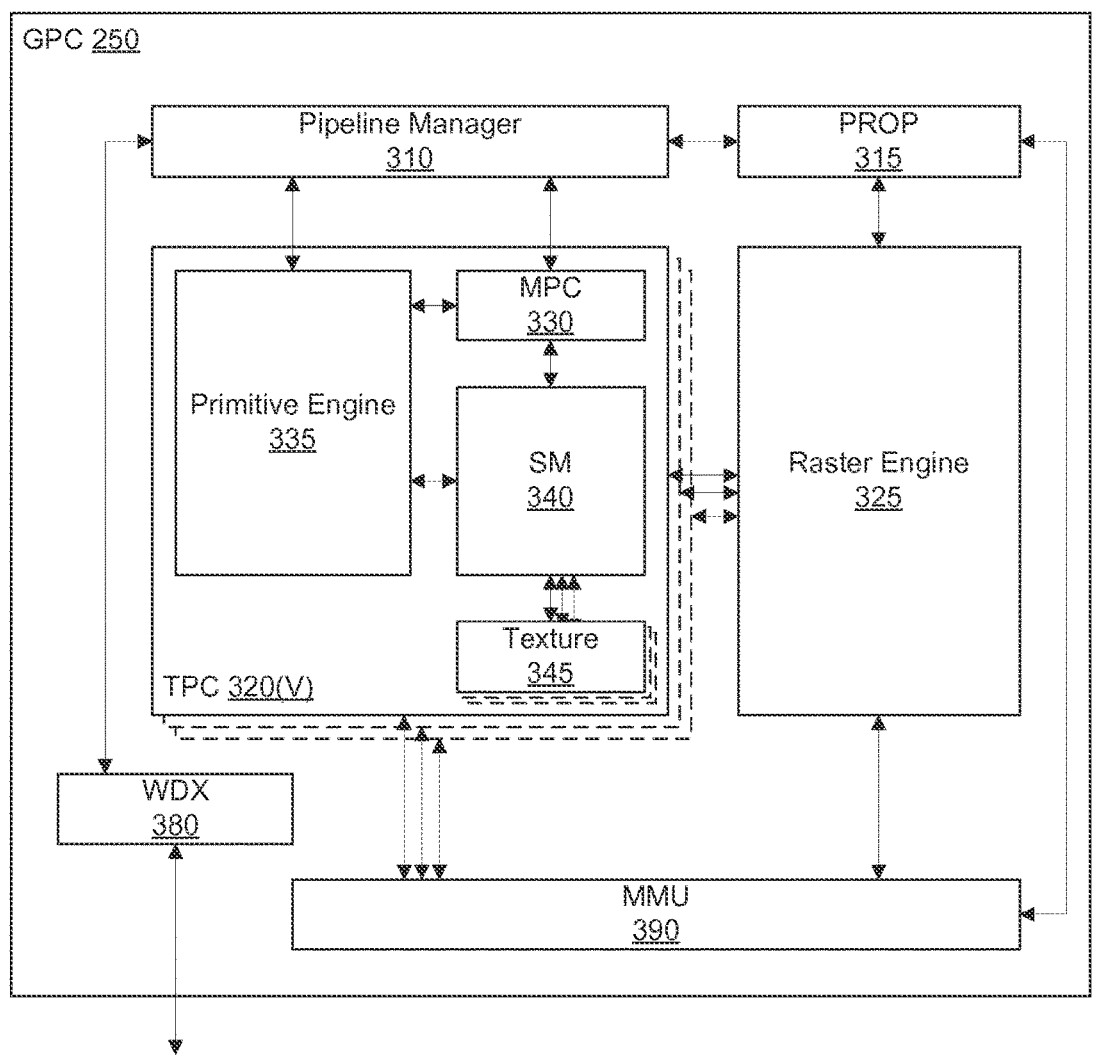
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a the coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes four (4) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
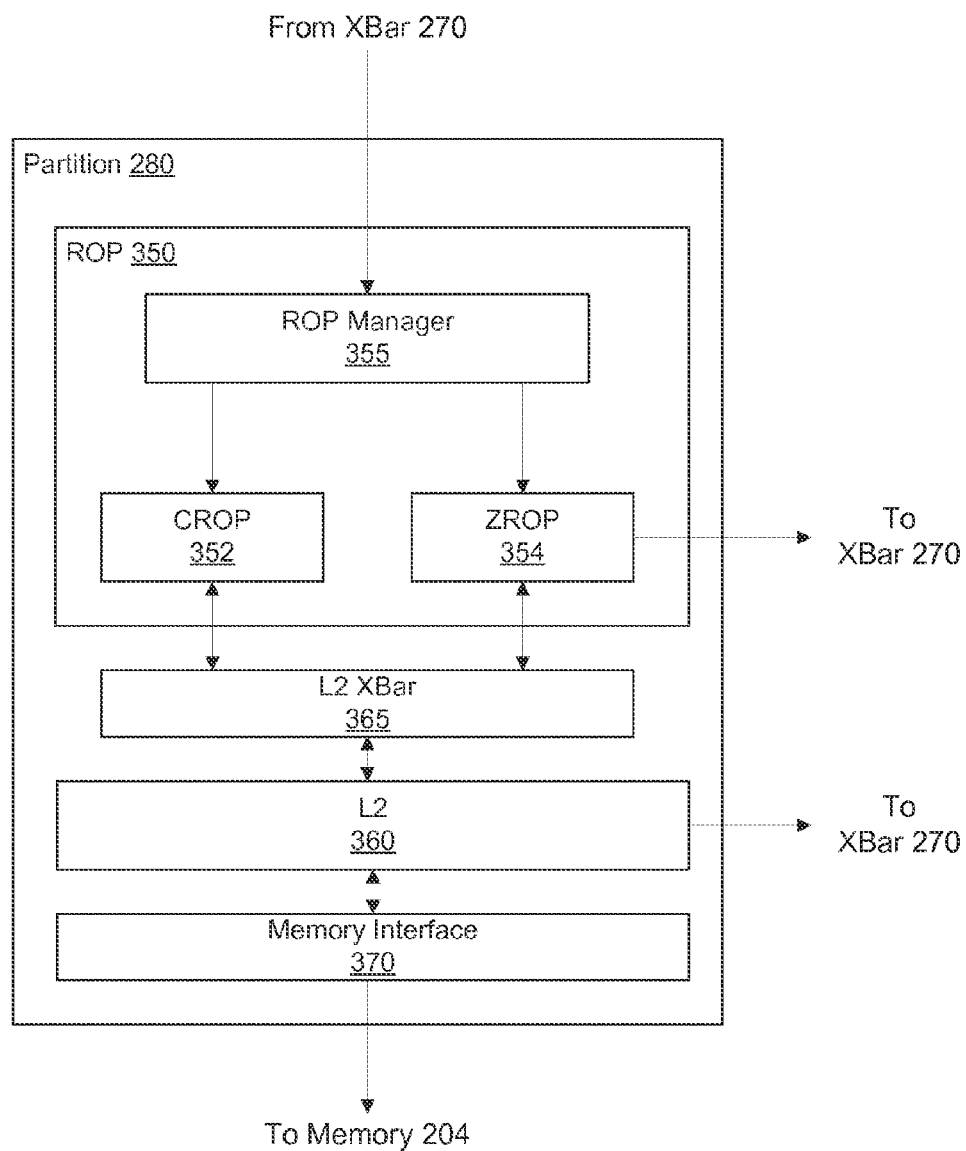
FIG. 3B illustrates a partition unit of the parallel processing unit of FIG. 2, accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM) in one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1)) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
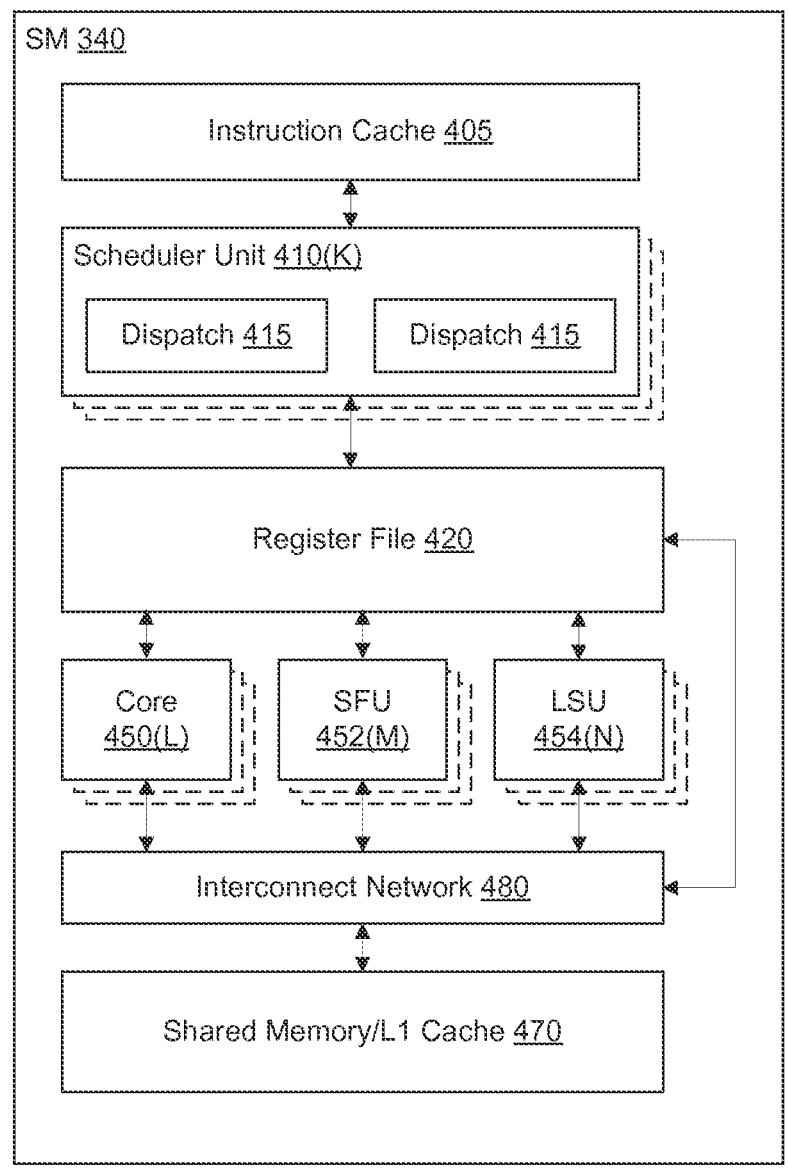
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., pixel blending operations, and the like), and N LSUs 454 that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
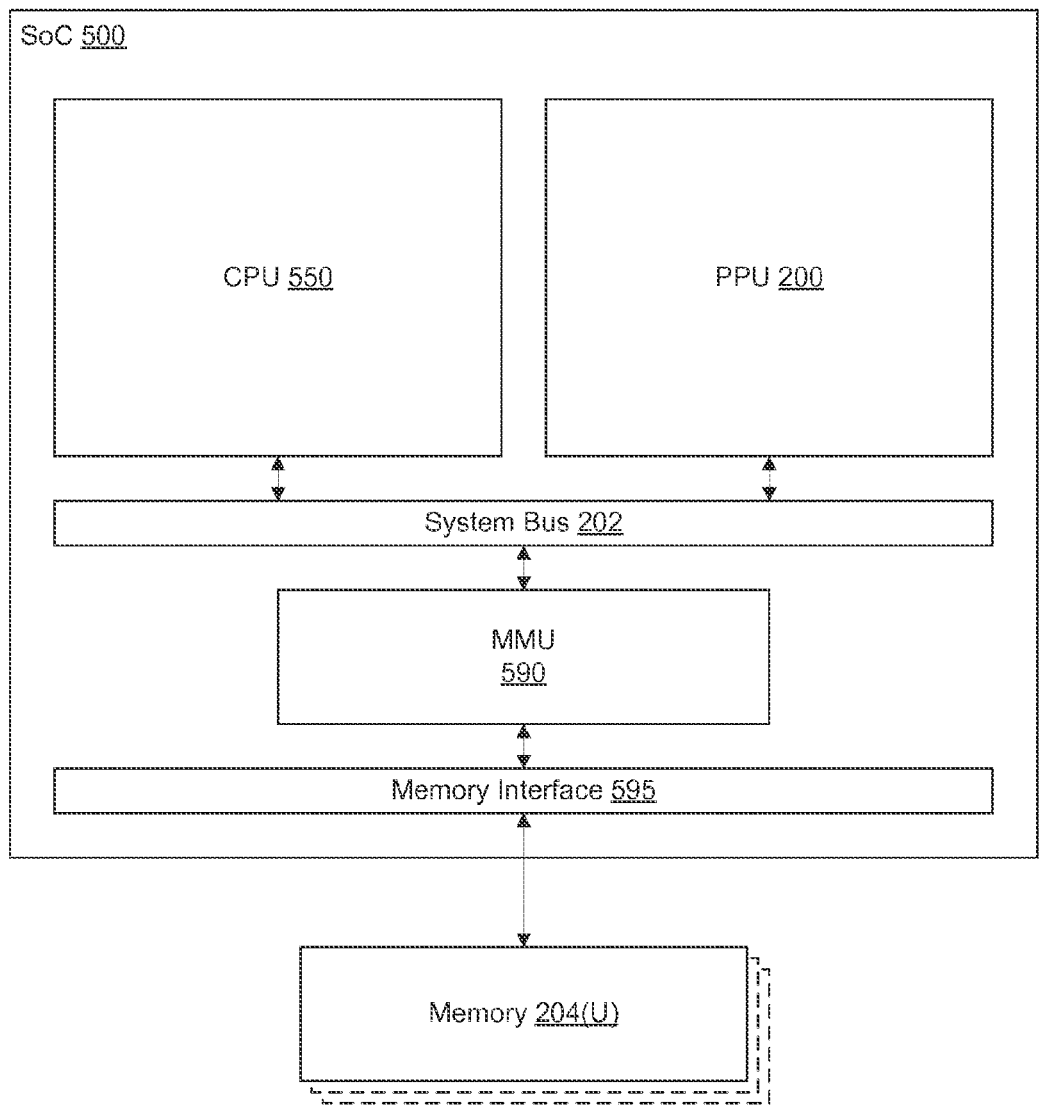
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
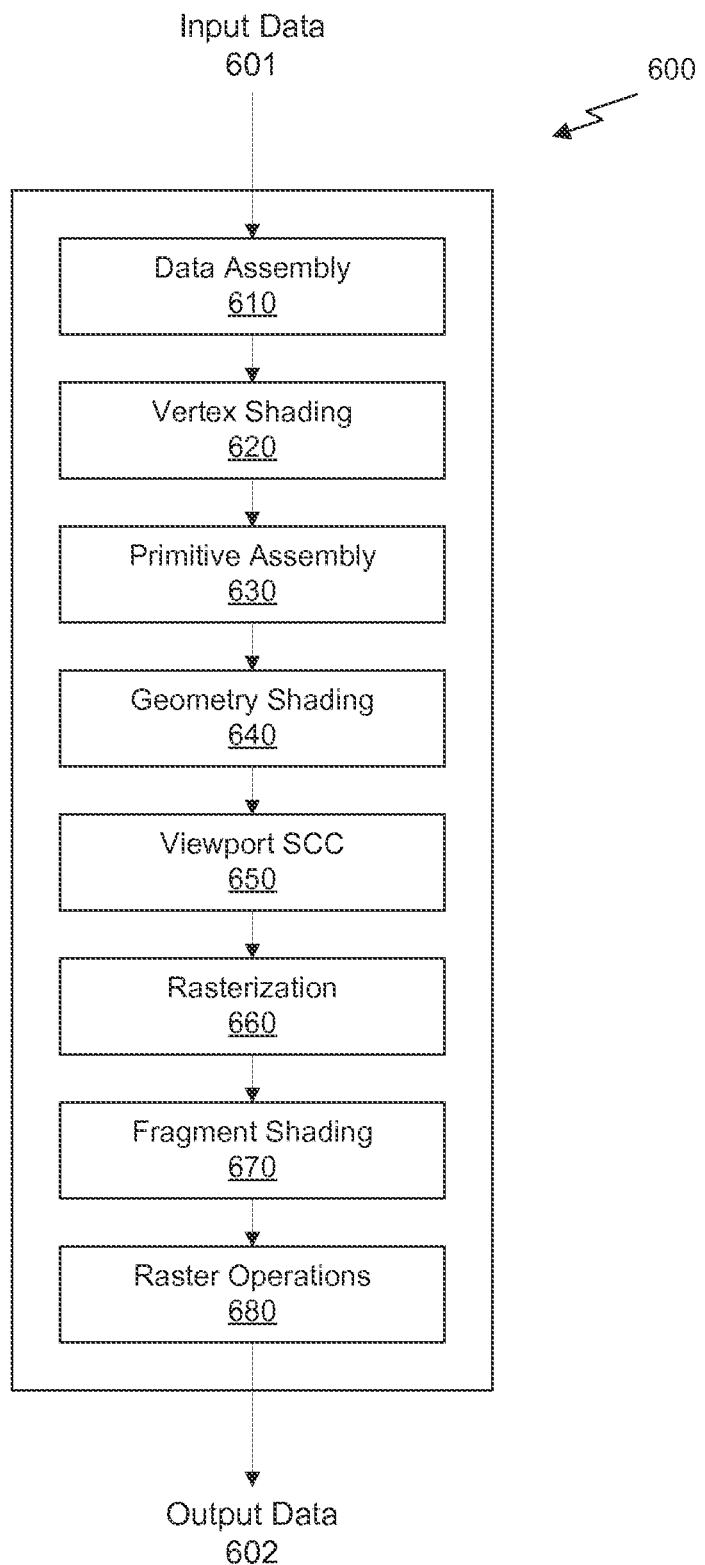
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API.

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate properties such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCI)) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

The viewport SCC stage 650 performs view/port scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and for clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments. The rasterization stage 660 may be configured to utilize the vertices of the geometric primitives to setup a set of plane equations from which various attributes can be interpolated. The rasterization stage 660 may also compute a coverage mask fir a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Control of a Sample Mask

Figures 7A, 7B:
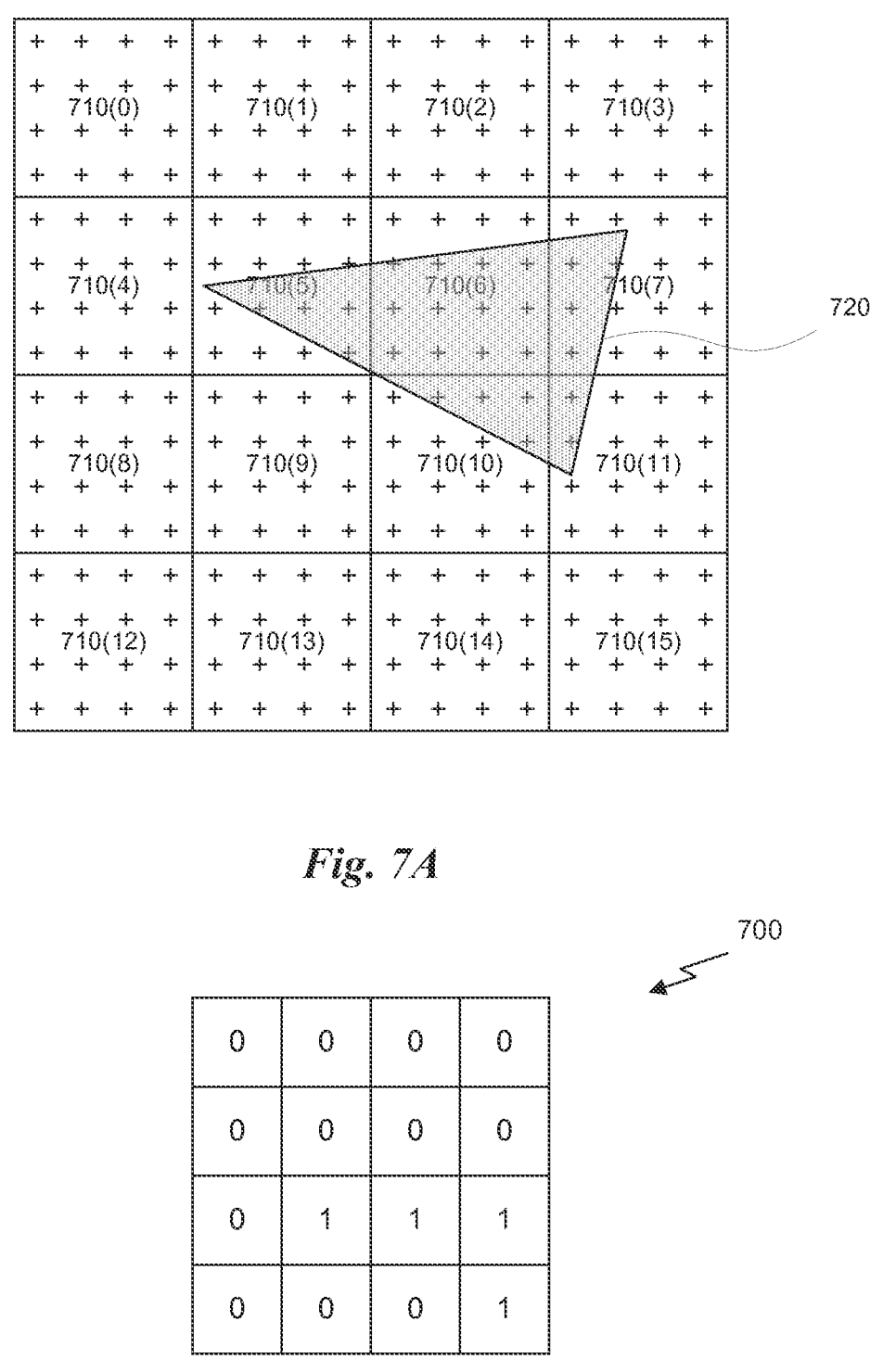

FIG. 7A illustrates a primitive 720, in accordance with one embodiment. As shown in FIG. 7A, the primitive 720 overlays a plurality of pixels 710. Each pixel 710 may be associated with a plurality of sample locations (indicated by the crosshairs). In one embodiment, each pixel 710 is associated with 16 sample locations, in alternative embodiments, a different numbers of sample locations may be defined for each pixel (e.g., 4 sample locations, 64 sample locations, etc.). Also, the sample locations may be evenly spaced relative to the boundaries of the pixel 710. Alternatively, the sample locations may be jittered. As shown in FIG. 7A, the primitive 720 at least partially covers (i.e., intersects) five of the sixteen pixels (pixels 710(5), 710(6), 710(7), 710(10), and 710(11)).

In one embodiment, the raster engine 325 includes fixed-function hardware for implementing the rasterization stage 660 of the graphics processing pipeline 600. During rasterization, the raster engine 325 receives vertex data that defines each primitive. The vertex data may include three vertices along with associated vertex attributes. For example, each vertex of the primitive 720 may be specified by a four component vector that identifies an x-coordinate, a y-coordinate, a z-coordinate, and a w-coordinate, which represents a location of the vertex in homogeneous coordinates. Each vertex may also be associated with a color value, texture coordinates (e.g., an s-coordinate and a t-coordinate), a normal vector, and the like.

The raster engine 325 may receive data for all three vertices of the primitive 720 and may use the vertex data to setup edge equations for the primitive. The raster engine 325 utilizes the edge equations to determine which pixels 710 intersect the primitive. For each intersected pixel 710, the raster engine may generate a fragment to be processed by a fragment shader during the fragment shading stage 670 of the graphics processing pipeline 600. The fragment may include an interpolated z-value (depth) for the fragment, interpolated values for each of the vertex attributes, and the coverage information that indicates which sample locations associated with the pixel 710 are covered by the primitive 720.

FIG. 7B illustrates the coverage information 700 for a fragment, in accordance with one embodiment. Although the coverage information 700 is shown for illustrative purposes as a two-dimensional array to correspond to a relative position of the sample locations for a pixel 710, in general, the coverage information 700 is an N-bit value with each bit corresponding to a particular sample location of the pixel 710. The coverage information 700 may be generated during a rasterization stage 660 of the graphics processing pipeline 600 and may be referred to, alternatively, as rasterized coverage information.

As shown in FIG. 7B, a fragment corresponding to pixel 710(5) of FIG. 7A would include the coverage information 700. The coverage information 700 includes 16-bits. In the coverage information 700, a value of "0" indicates that a sample location is not covered by the primitive 720 and a value of "1" indicates that a sample location is covered by the primitive 720. Because the primitive 720 covers four sample locations in pixel 710(5), the coverage information 700 is given as 0000000000111110001. The fragment including the coverage information 700 may be stored in a memory, such as a register file 420 associated with an SM 340 configured to execute a fragment shader, when the output of the rasterization stage 660 is immediately consumed or the output of the rasterization stage 660 may be stored in the memory 204 for later processing.

Figure 8:
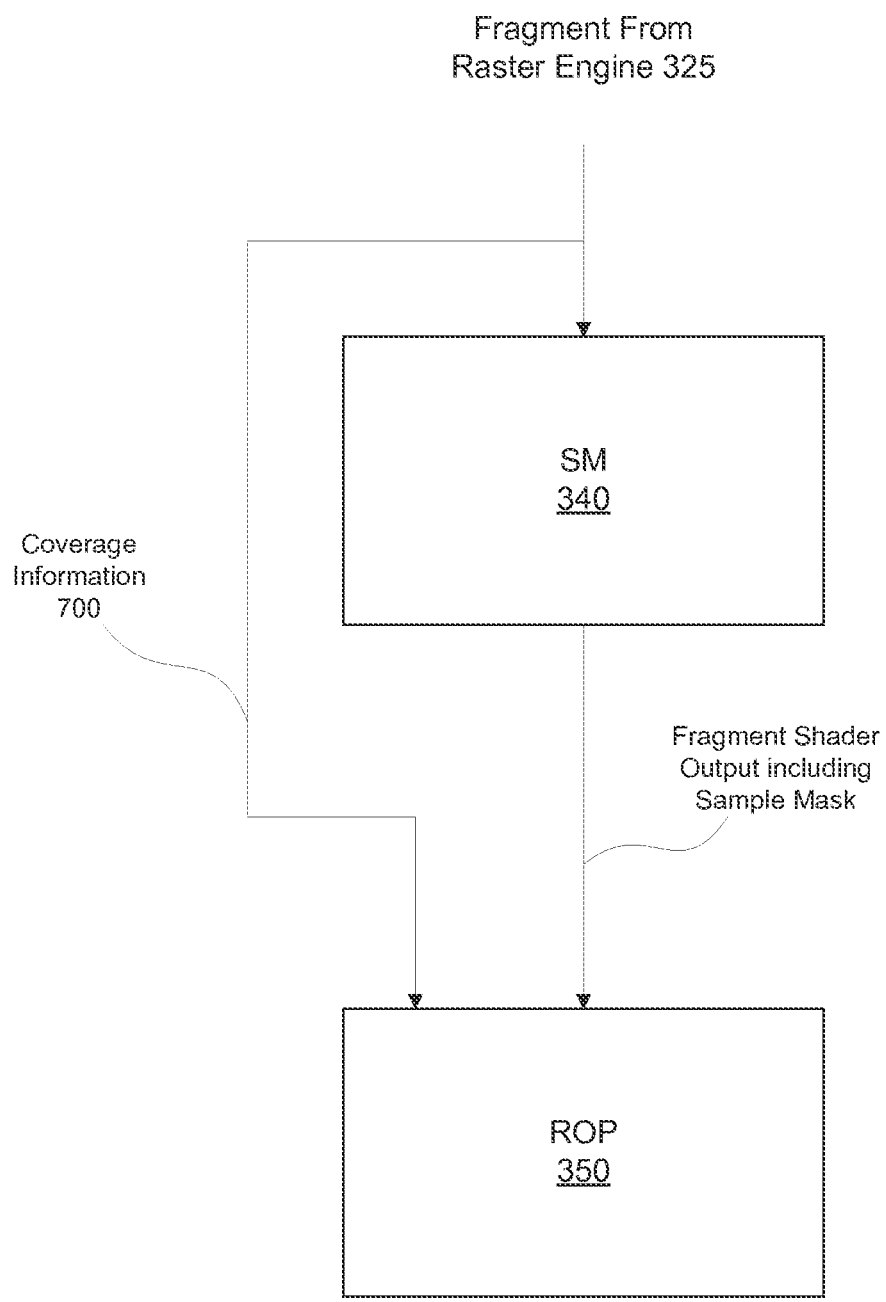
FIG. 8 illustrates an operation for rendering a primitive, in accordance with one embodiment.

FIG. 8 illustrates an operation for controlling a sample mask from a fragment shader program, in accordance with one embodiment. As shown in FIG. 8, a rasterizer (e.g., raster engine 325) generates one or more fragments for a primitive such as primitive 720. A fragment shader, executed by one or more SMs 340, is configured to process the fragments. The data for each fragment is routed to a particular SM 340 configured to process that fragment. The data includes the coverage information 700 generated during the rasterization stage 660 of the graphics processing pipeline 600. In one embodiment, the coverage information 700 is also routed to the ROP 350, which is configured to blend the output of the fragment shader with values stored in the frame buffer to generate a final value for each pixel.

During the raster operations stage 680 of the graphics processing pipeline 600, the ROP 350 may replace the coverage information 700 generated during the rasterization stage 660 of the graphics processing pipeline 600 with the sample mask generated during the fragment shading stage 670 of the graphics processing pipeline 600. In one embodiment, the ROP 350 is configured to reinitialize the coverage information 700 for a fragment to indicate that the sample locations associated with the corresponding pixel are fully covered. In other words, the coverage information 700 transmitted to the ROP 350 is overwritten with 0xFF (i.e., all "1"s). A bitwise AND is then performed to combine the modified coverage information 700 with the sample mask generated by the fragment shader. In effect, the sample mask generated by the fragment shader is transmitted to the ROP 350 and replaces the coverage information 700 generated during the rasterization stage 660. Any sample location within the pixel may be controlled by the fragment shader to be indicated as covered or uncovered. Importantly, any sample location may be controlled by the fragment shader independent of the coverage information 700. As such, the fragment shader may write the sample mask during shading in order to control the operation of the ROP 350 during the raster operations stage 680 of the graphics processing pipeline 600.

It will be appreciated that the PPU 200 described herein is only one example architecture for implementing control of a sample mask by a fragment shader. For example, in other embodiments, the rasterization stage 660 of the graphics processing pipeline 600 may be implemented within a programmable unit such as the SM 340 rather than a dedicated hardware unit such as the raster engine 325. Other types of architectures which generate coverage information during rasterization of a primitive and then replace the coverage information with a sample mask generated during shading are contemplated as being within the scope of the present disclose.

In one embodiment, the PPU 200 is communicatively coupled to a host processor, such as a CPU. The host processor may be coupled to a memory storing a graphics application, an operating system, a device driver for the PPU 200, and the like. The device driver may implement a graphics API, such as the OpenGL API. In order to implement the functionality to override coverage information from the fragment shader, the device driver may also implement an extension to the graphics API. The graphics application may include an instruction that utilizes the extension to the graphics API in order to configure the PPU 200 to control the sample mask via the fragment shader.

For example, an API extension to the OpenGL® specification, referred to as NV_sample_mask_override_coverage, may be defined and implemented by the device driver for the PPU 200. The extension allows the fragment shader to control whether the gl_SampleMask output array can enable samples that were not covered by the primitive, or that failed the early depth/stencil tests, to indicate that the sample was covered by the primitive. The functionality may be enabled by re-declaring the gl_SampleMask output array with an "override_coverage" layout qualifier in an instruction in the graphics application, as follows:

layout(override_coverage) out int gl_SampleMask[ ];

Once the gl_SampleMask output array variable has been re-declared, then the fragment shader can override the coverage information by writing a value to the gl_SampleMask variable for each fragment. If the fragment shader does not explicitly write a value to the gl_SampleMask variable, then the sample mask is undefined and the coverage information is not modified by the ROP 350. However, if the fragment shader writes a particular bit in the gl_SampleMask output array as 0 then the corresponding sample location is treated as uncovered, or if the fragment shader writes a particular bit in the SampleMask output array as 1 then the corresponding sample location is treated as covered. The ROP 350 will replace the coverage information with the sample mask specified in the gl_SampleMask output array. If the graphics application does not declare the gl_SampleMask output array using the override_coverage layout qualifier, then the ROP 350 will be configured to perform a bitwise AND of the coverage information with the value stored in the gl_SampleMask output array, if the value is written to the gl_SampleMask output array while shading the fragment, as previously specified by the OpenGL® specification.

In other embodiments, the NV_sample_mask_override_coverage extension to the OpenGL® API may be implemented for architectures that differ from PPU 200 by other device drivers. In yet other embodiments, an extension having similar functionality may be defined for other graphics APIs, such as the Direct3D API.

It will be appreciated that the ability to replace the coverage information 700 may be enabled for any fragment shading algorithm or application, and is not limited to a TIR application. Specifically, enabling the coverage information 700 to be replaced by a sample mask generated by the fragment shader allows an application to "turn on" samples that were not originally covered by the primitive. Furthermore, it will be appreciated that a fragment shader thread, which is an instance of the fragment shader executed for a particular fragment, may only affect the samples in a corresponding pixel. The fragment shader thread cannot turn on samples in other pixels nor can new fragments be created. In addition, when using hybrid anti-aliasing with more than one fragment shader pass, the fragment shader thread can only turn on samples corresponding to that pass.

As used herein, a fragment shader thread refers to a particular instance of the fragment shader program executed for a set of fragment data associated with a single pixel covered by a particular primitive. For example, 16 cores 450 of an SM 340 may be configured to execute 16 fragment shader threads in parallel, each core 450 being associated with one of 16 pixels of a target render surface. When a primitive is rasterized, any core associated with a pixel that does not intersect the primitive will be disabled. For example, 16 cores 450 of an SM 340 configured to execute a fragment shader may correspond to the 16 pixels 710 shown in FIG. 7A. During shading, only five of the cores 450 may be enabled (and 11 cores disabled) when processing the five fragments associated with primitive 720. Each of the five active cores may execute a single fragment shader thread corresponding to the fragments for each of the five pixels 710 intersected by the primitive 720.

In one embodiment, the graphics processing pipeline 600 may include depth testing (i.e., Z-test) as a way to cull any primitives that may be fully covered by other primitives in order to reduce the number of fragments that are fully shaded. Typically, the depth buffer write usually happens after shading and, therefore, the modified coverage information reflecting the sample mask generated by the fragment shader may be used to write depth values into the depth buffer. However, it is still possible to perform an early conservative depth test (i.e., Zcull) before shading (i.e., before the fragment shader has generated a sample mask that is used to modify the coverage information). When early-z testing is enabled, it is necessary to treat each pixel as fully covered when computing the depth range (z-gamut) for a primitive. In other words, because the fragment shader can "turn on" samples that are not covered by the primitive during rasterization, care should be taken that a more conservative value for z-gamut is used during early-z testing to ensure that a fragment is not culled prior to shading if any uncovered sample in the primitive could be visible based on the values stored in the depth buffer if the fragment shader changes that sample from uncovered to covered. Therefore, it is necessary to not use a z-per-sliver (i.e., z values at the triangle-edge pixel-edge intersection) or the original z-gamut of the primitive when performing early-z testing.

Path rendering is one application where control of a sample mask by the fragment shader may be utilized. Path rendering refers to a style for rendering 2D graphics. In path rendering, a scene is specified as a sequence of screen resolution independent outlines, referred to as paths, that may be filled or stroked (i.e., unfilled). The paths can be painted as constant colors, linear or radial gradients, or images. Path rendering generates images that can be scaled independent of the screen resolution. An example of using a fragment shader to control a sample mask during path rendering is to smear one sample's coverage to a group of samples in the pixel, causing the group of the samples to be treated as if they were at a single sample location.

Multi-sample color buffers are another application where control of a sample mask by the fragment shader may be utilized. Anti-aliasing refers to a variety of techniques for reducing image artifacts caused by the sampling of high frequency data at limited resolutions. One technique, multisample anti-aliasing (MSAA) refers to an implementation where a fragment shader is executed once per pixel (e.g., for a single sample location at the center of the pixel), but where depth and stencil values are calculated for each sample location in the pixel. In MSAA, a single color value is blended with the value in a color buffer based on the coverage information for a fragment. In another technique, full-scene anti-aliasing (FSAA) or supersampling refers to an implementation where an image is generated at a higher resolution and then downsampled to produce the final image. A color value may be computed for each sample location and blended with values stored in a multi-sample color buffer. After the full scene is shaded the color buffer may be filtered to produce a final color value for each pixel.

When multi-sample color buffers are utilized in a rendering algorithm, each slot in the multi-sample color buffer corresponds to a particular sample location (or subset of sample locations) for a particular pixel. For example, the multi-sample color buffer may include four slots per pixel, where each of the four slots corresponds to a different sample location in the pixel. A color value may be generated for each of the sample locations covered by the primitive and stored in the multi-sample color buffer. Therefore, the coverage information 700 is utilized to determine which slots in the color buffer should be overwritten or blended with the color value output by the fragment shader. With conventional techniques, data in the multi-sample color buffer can only be written to slots of the multi-sample color buffer covered by the primitive. In contrast, when the sample mask generated by the fragment shader is used to replace the coverage information 700 generated during the rasterization stage 660, then the multi-sample color buffer may be treated as a more general data structure. More specifically, the fragment shader may be used to write a sample mask that indicates which slot (or slots) of the color buffer corresponds to the color value output by the fragment shader. The multi-sample color buffer may then be utilized as an array of slots that can be written to with an arbitrary set of indices chosen by the fragment shader. The multi-sample color buffer can then be filtered to generate a single value for each pixel in the rendered image, or the multi-sample color buffer can be processed by a different fragment shader program in a second pass where the data in the multi-sample color buffer is processed in a way defined by the program.

In one embodiment, a single color value is generated by the fragment shader for each fragment. The single color value may then overwrite, or be blended with, the value stored in each slot of the multi-sample color buffer indicated by the coverage information. In other words, a different color may be stored for each sample location based on multiple fragments associated with multiple primitives that cover the sample locations for a pixel, even though a single color is generated over the whole pixel for any particular fragment. In another embodiment, different color values may be generated for each particular sample location. For example, texture coordinates may be generated for each sample location during rasterization. A plurality of fragment shader threads are then executed, with each fragment shader thread associated with a particular sample location. Each fragment shader thread then samples a color value from a texture map based on the texture coordinates for that sample location. Finally, the resulting color values are written to the corresponding slot in the multi-sample color buffer.

There are a variety of use cases where the ability to write to any arbitrary slot in the multi-sample color buffer is beneficial. For example, one such use is in anti-aliasing schemes where the number of slots in the multi-sample color buffer is less than a number of sample locations associated with visibility (e.g., depth and stencil testing). In other words, the resolution of the multi-sample color buffer is less than a resolution of the sample locations. For example, a pixel may be associated with 16 sample locations for visibility but a multi-sample color buffer may only include two or four slots for storing color values for each pixel. A multi-sample color buffer having a number of slots equal to the number of sample locations associated with visibility may require too much memory. However, a more manageable mufti-sample color buffer may be implemented such that multiple color values may be stored for each pixel while still maintaining visibility information at higher resolutions. The multiple color values stored in the color buffer may then be blended based on the higher resolution visibility information.

By decoupling the output color value from a visibility sample location, it is possible to use the reduced number of slots to represent any sample locations in, e.g., the depth buffer. One possible implementation of a lossy algorithm would be to implement a multi-sample color buffer having two slots and generate a final color value based on a weighted average of the color values stored in the two slots. The weights may be determined based on the visibility information (i.e., sample mask) generated by the fragment shader.

Another use case is implementing order-independent transparency utilizing a multi-sample color buffer, where an algorithm stores an unsorted list of semi-transparent colors and depths per pixel. The algorithm then sorts and composites the semi-transparent colors in a post-processing pass. The fragment shader maintains a per-pixel index that counts the number of semi-transparent fragments that are associated with the pixel. The fragment shader can then store the fragment color and depth at the sample associated with the index by setting the appropriate bit in the sample mask (i.e., the color and depth sample are not stored in the sample location based on coverage, but rather in the order of the semi-transparent fragments corresponding to that particular pixel). When the index count exceeds the number of samples, the mask can be set to zero and the fragment shader can fall back to a slower global list of fragments in order to store the remaining color/depth combinations associated with the pixel.

Yet another use case is implementing a limited form of conservative rasterization. In conservative rasterization, the coverage information may be generated such that if any sample is covered by the primitive, then all samples are treated as covered by the primitive. However, when conservative rasterization is implemented, then typically depth and stencil tests are performed based on the pixel being "fully covered," which may lead to some inaccuracies in the algorithm. Instead, an algorithm may implement conservative rasterization by performing early-z and/or stencil tests based on exact coverage information generated by the rasterizer and then adjusting the sample mask to indicate that the entire pixel is "covered" if any sample location for a fragment is "covered." Voxelization and collision detection algorithms may benefit from a "stencil then cover" application of conservative rasterization.

The use cases described above offer examples of specific algorithms that may utilize control of a sample mask provided by the fragment shader. However, a variety of use cases and applications of the concept described above are contemplated as being within the scope of the present disclosure.

Figure 9:
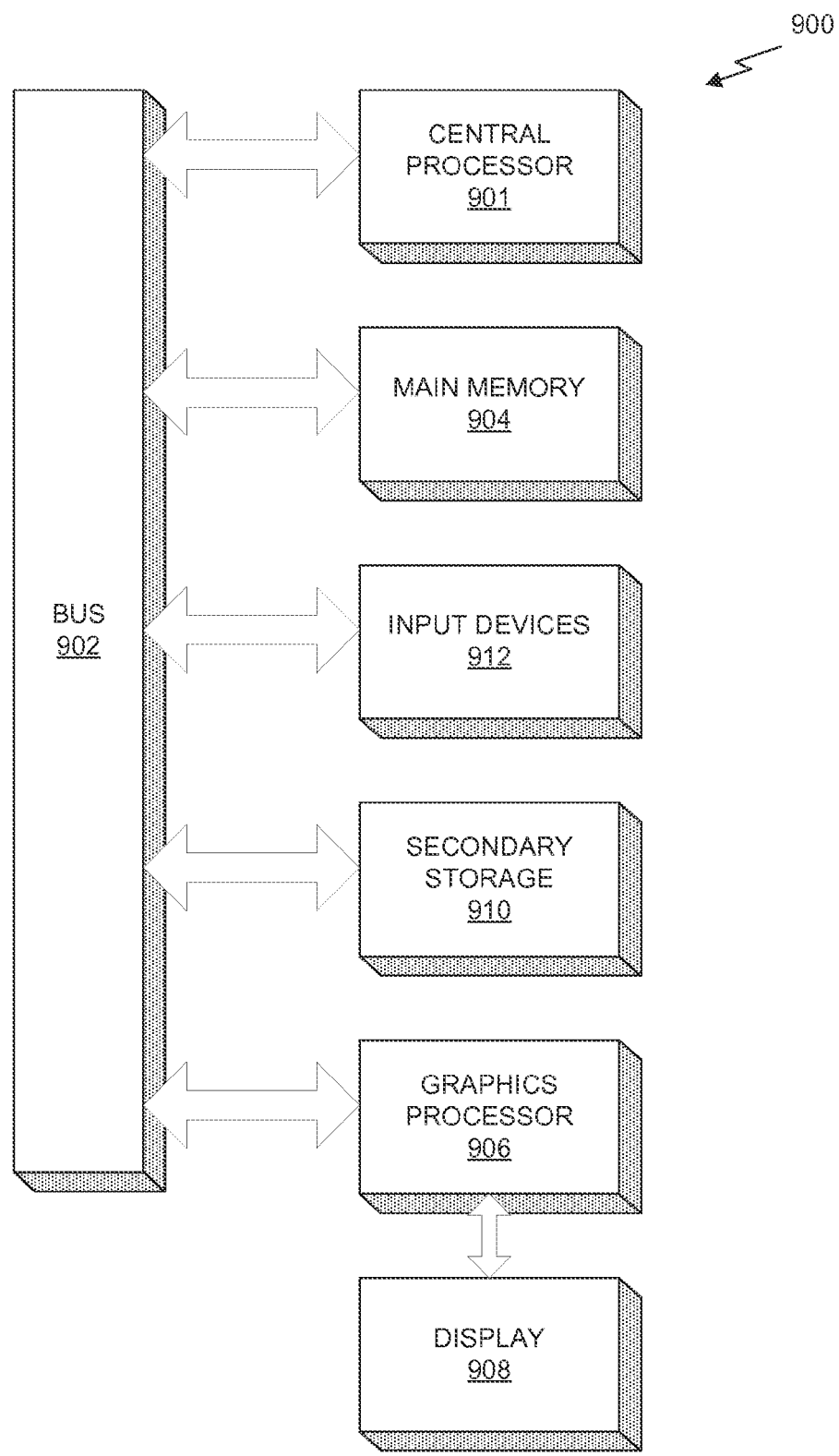
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
generating a fragment for each pixel that is covered, at least in part, by a primitive;
determining coverage information for each fragment corresponding to the primitive; and
for each fragment:
generating, by a fragment shader, a sample mask that indicates a first sample of a first pixel is covered, wherein, according to the coverage information, the first sample of the first pixel is not covered by the primitive,
replacing the coverage information for the fragment with the sample mask, and
writing, based on the sample mask, a result generated by the fragment shader to a memory.

2. The method of claim 1, wherein a fragment comprises a data structure that includes one or more interpolated attributes as well as the sample mask related to a plurality of samples, including the first sample, associated with the first pixel.

3. The method of claim 1, wherein generating the fragment and determining coverage information are performed during a rasterization stage of a graphics processing pipeline.

4. The method of claim 3, wherein the graphics processing pipeline is implemented, at least in part, by a parallel processing unit that includes a plurality of programmable streaming multiprocessors (SM), each SM configured to execute a plurality of fragment shader threads in parallel.

5. The method of claim 4, wherein each fragment shader thread corresponds to a different fragment generated during the rasterization stage of the graphics processing pipeline.

6. The method of claim 4, wherein generating the sample mask is performed during a fragment shading stage of the graphics processing pipeline, and wherein replacing the coverage information with the sample mask is performed during a raster operations stage of the graphics processing pipeline.

7. The method of claim 6, wherein the parallel processing unit includes a raster engine configured to implement, at least in part, the rasterization stage of the graphics processing pipeline and a raster operations unit configured to implement, at least in part, the raster operations stage of the graphics processing pipeline.

8. The method of claim 1, wherein the results are written to a multi-sample color buffer.

9. The method of claim 1, wherein the coverage information comprises an N-bit mask, each bit in the N-bit mask corresponding to a different sample location associated with a pixel corresponding to the fragment.

10. The method of claim 9, wherein the sample mask comprises N bits, each bit of the sample mask corresponding to the different sample locations.

11. The method of claim 1, wherein the first sample of a first pixel failed an early z test before determining the coverage information for the first pixel.

12. The method of claim 1, further comprising, before replacing the coverage information for the fragment with the sample mask,
setting the coverage information for the first pixel to indicate that all of the samples within the first pixel are fully covered; and
combining the coverage information with the sample mask using a bitwise AND.

13. A non-transitory computer-readable storage medium storing instructions that, when executed by a processor, cause the processor to perform steps comprising:
generating a fragment for each pixel that is covered, at least in part, by a primitive;
determining coverage information for each fragment corresponding to the primitive; and
for each fragment:
generating, by a fragment shader, a sample mask that indicates a first sample of a first pixel is covered, wherein, according to the coverage information, the first sample of the first pixel is not covered by the primitive,
replacing the coverage information for the fragment with the sample mask, and
writing, based on the sample mask, a result generated by the fragment shader to a memory.

14. The non-transitory computer-readable storage medium of claim 13, wherein a fragment comprises a data structure that includes one or more interpolated attributes as well as the sample mask related to a plurality of samples, including the first sample, associated with the first pixel.

15. The non-transitory computer-readable storage medium of claim 13, wherein the processor comprises a parallel processing unit that includes a plurality of programmable streaming multiprocessors (SM), each SM configured to execute a plurality of fragment shader threads in parallel, and wherein generating the fragment and determining coverage information are performed during a rasterization stage of a graphics processing pipeline that is implemented, at least in part, by the parallel processing unit.

16. The non-transitory computer-readable storage medium of claim 13, wherein the coverage information comprises an N-bit mask, each bit in the N-bit mask corresponding to a different sample location associated with a pixel corresponding to the fragment, and wherein the sample mask comprises N bits, each bit of the sample mask corresponding to the different sample locations.

17. A system, comprising:
a parallel processing unit configured to implement, at least in part, a graphics processing pipeline, the parallel processing unit configured render primitives by:
generate a fragment for each pixel that is covered, at least in part, by a primitive,
determine coverage information for each fragment corresponding to the primitive, and
for each fragment:
generate, by a fragment shader, a sample mask that indicates a first sample of a first pixel is covered, wherein, according to the coverage information, the first sample of the first pixel is not covered by the primitive,
replace the coverage information for the fragment with the sample mask, and
write, based on the sample mask, a result generated by the fragment shader to a memory.

18. The system of claim 17, wherein generating the fragment and determining coverage information are performed during a rasterization stage of the graphics processing pipeline, wherein generating the sample mask is performed during a fragment shading stage of the graphics processing pipeline, and wherein replacing the coverage information with the sample mask is performed during a raster operations stage of the graphics processing pipeline.

19. The system of claim 17, further comprising:
a memory storing a graphics application and a device driver; and
a host processor coupled to the memory and the parallel processing unit, the host processor configured to execute the graphics application and the device driver, wherein the device driver implements an extension to a graphics API utilized by the graphics application in order to cause the parallel processing unit to replace the coverage information for the fragment with the sample mask.

20. The system of claim 17, wherein the parallel processing unit includes a plurality of programmable streaming multiprocessors (SM), each SM configured to execute a plurality of fragment shader threads in parallel.

* * * * *